(12) United States Patent
Zimmer et al.

(10) Patent No.: US 8,342,304 B2
(45) Date of Patent: Jan. 1, 2013

(54) PNEUMATIC RETARDING DEVICE

(76) Inventors: Günther Zimmer, Rheinau (DE); Martin Zimmer, Rheinau (DE)

(*) Notice: Subject to any disclaimer, the term of this patent is extended or adjusted under 35 U.S.C. 154(b) by 942 days.

(21) Appl. No.: 12/383,853

(22) Filed: Mar. 26, 2009

(65) Prior Publication Data

US 2009/0205485 A1    Aug. 20, 2009

Related U.S. Application Data

(63) Continuation-in-part of application No. PCT/EP2007/001521, filed on Aug. 27, 2007.

(30) Foreign Application Priority Data

Aug. 28, 2006  (DE) .................. 10 2006 040 085

(51) Int. Cl.
*F16F 9/18* (2006.01)
(52) U.S. Cl. .................. 188/322.18; 277/589
(58) Field of Classification Search .......... 188/280, 188/282.1, 322.16–322.18; 277/556, 560, 277/587, 589
See application file for complete search history.

(56) References Cited

U.S. PATENT DOCUMENTS

| | | | | |
|---|---|---|---|---|
| 2,889,183 A * | 6/1959 | Peras | ...................... | 277/437 |
| 3,942,806 A * | 3/1976 | Edlund | .................. | 277/589 |
| 2004/0012156 A1* | 1/2004 | Cobb | .................. | 277/602 |
| 2006/0118371 A1* | 6/2006 | Zimmer et al. | ........... | 188/280 |
| 2007/0175717 A1* | 8/2007 | Grabher | ............. | 188/282.1 |

FOREIGN PATENT DOCUMENTS

| | | |
|---|---|---|
| DE | 197 17 937 | 5/1998 |
| DE | 101 00 014 | 7/2002 |
| DE | 102 14 596 | 1/2003 |
| DE | 203 11 217 | 11/2003 |
| DE | 103 13 659 | 9/2004 |
| DE | 20 2004 018 413 | 2/2005 |
| EP | 1 211 375 | 6/2002 |
| EP | 1 260 159 | 11/2002 |
| WO | WO 03/100287 | 12/2003 |
| WO | 2004/067988 | 8/2004 |
| WO | WO 2006/063657 | 6/2006 |

* cited by examiner

*Primary Examiner* — Christopher Schwartz
(74) *Attorney, Agent, or Firm* — Klaus J. Bach

(57) ABSTRACT

The invention concerns a pneumatic retarding device with a cylinder dividing the cylinder into a displacement chamber and a compensation chamber and including a piston with a piston rod movably supported in the cylinder and having a piston seal element wherein, upon movement of the piston, a piston movement opposing force is generated while an air leakage flow is established past the piston for damping piston movement. The piston and the piston rod are formed integrally and the piston seal element has at least two deformation zones of which one responds faster to a pressure change in the displacement chamber then the other which is subjected to the pressure change via a restrictive passage. Also, a guide system is provided with such a retarding device.

9 Claims, 3 Drawing Sheets

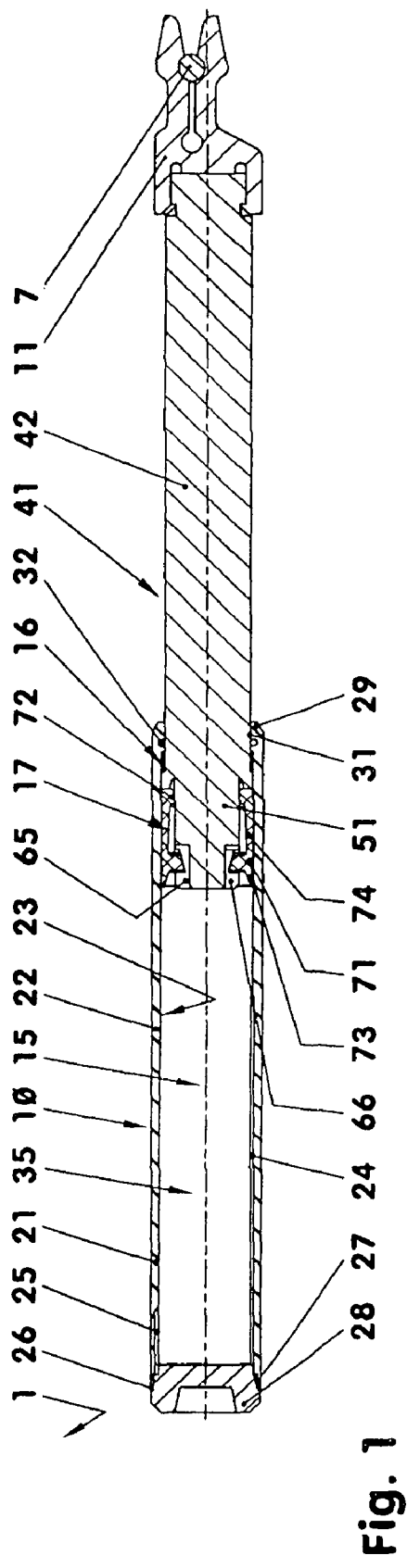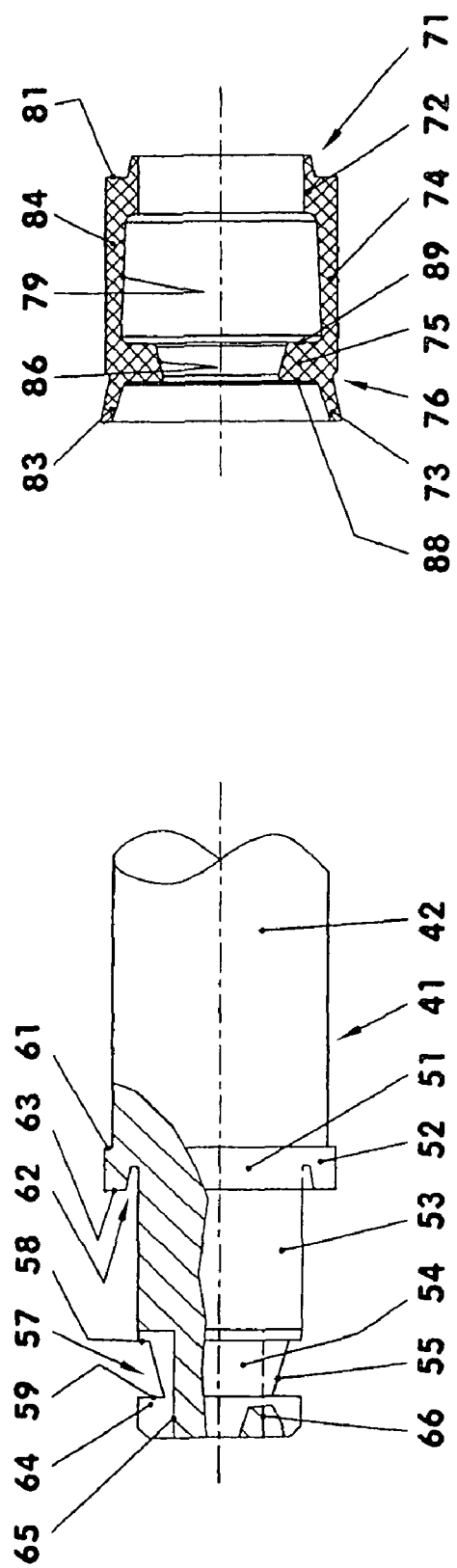

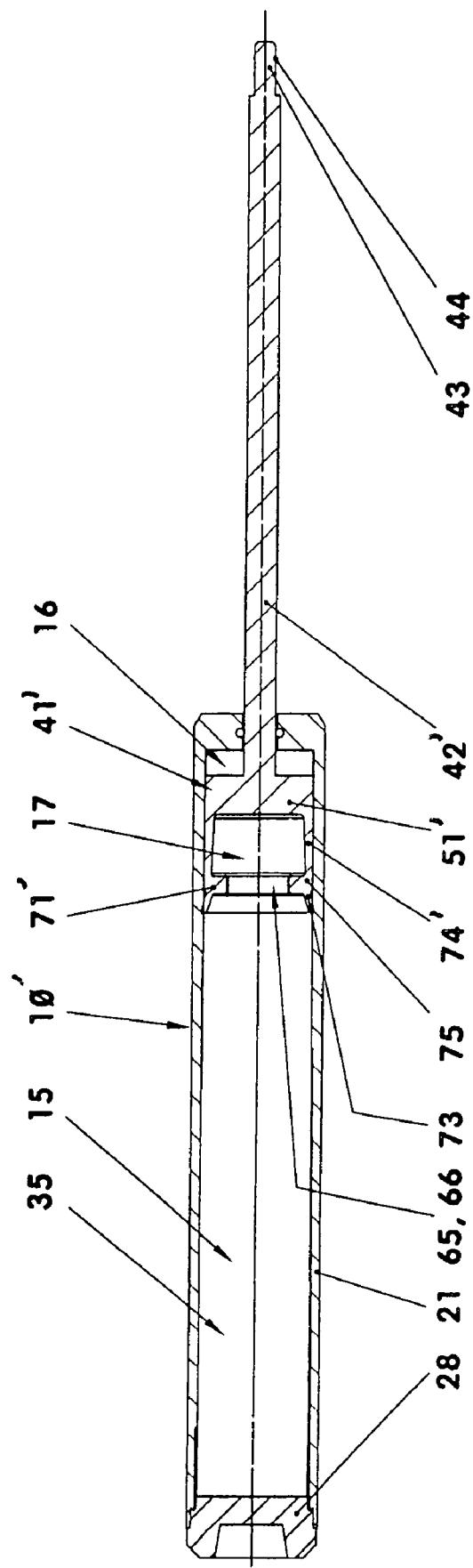

PNEUMATIC RETARDING DEVICE

This is a Continuation-In-Part Application of pending international patent application PCT/EP2007/001521 filed Aug. 27, 2007 and claiming the priority of German patent application 10 2006 040 085.2 filed Aug. 28, 2006.

BACKGROUND OF THE INVENTION

The present invention resides in a pneumatic retarding device with a cylinder including a piston movably supported therein by a piston rod in sealed relationship with the cylinder and dividing the cylinder into a displacement chamber and a compensation chamber providing a force counteracting piston movement in the cylinder but permitting a leakage flow of air between the displacement chamber and the compensation chamber at least during movement of the piston into the displacement chamber and in a guide system including such a retarding device.

DE 102 14 596 A1 discloses such a retarding device, which however, comprises a relatively large number of different parts which must be produced individually and subsequently be assembled which is quite time consuming so that the retarding device of DE 102 14 596 A is relatively expensive.

It is the object of the present invention to provide a pneumatic retarding device and also a guide system with a retarding device which can be manufactured inexpensively and which can generate relatively large retardation forces.

SUMMARY OF THE INVENTION

The invention concerns a pneumatic retarding device with a cylinder dividing the cylinder into a displacement chamber and a compensation chamber and including a piston with a piston rod movably supported in the cylinder and having a piston seal element wherein, upon movement of the piston, a piston movement opposing force is generated while an air leakage flow is established past the piston for damping piston movement. The piston and the piston rod are formed integrally and the piston seal element has at least two deformation zones of which one responds faster to a pressure change in the displacement chamber then the other which is subjected to the pressure change via a restrictive passage. Also, a guide system is provided with such a retarding device.

The piston, the piston seal element and the piston rod may be formed as a single piece piston unit. The piston element comprises at least two deformation zones of which, during a pressure change, a first deformation zone is rapidly subjected to deformation whereas the second zone is deformed at a slower rate than the first zone.

In a guide system with such a retardation arrangement, at least the piston and the piston rod are formed as a one-part integral piston unit. Also in this case, the piston seal element comprises at least two deformation zones which are deformed at different rates during a pressure change in the displacement chamber.

The invention will become more readily apparent from the following description of particular embodiments thereof on the basis of the accompanying drawings.

BRIEF DESCRIPTION OF THE DRAWINGS

FIG. 1 shows a pneumatic retarding device according to the invention,

FIG. 2 shows a piston unit including piston rod and the piston,

FIG. 3 shows the piston seal structure,

FIG. 7 shows a retarding device with a piston unit comprising a piston, a piston rod and a piston seal element.

DETAILED DESCRIPTION OF A PARTICULAR EMBODIMENT

Figure 4:
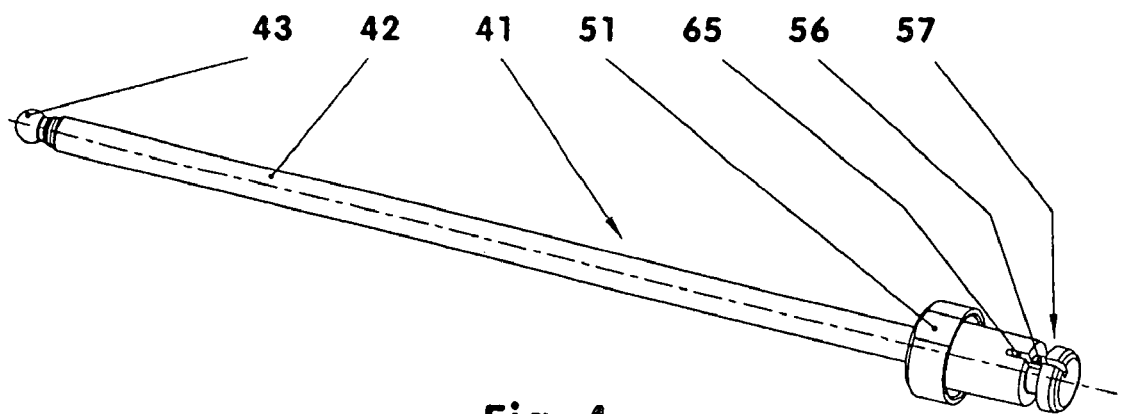
FIG. 4 shows the piston unit including the guide rod section.

FIG. 1 shows a retarding device 10 which is installed in a guide system which however is not shown. The guide system for example supports and guides a furniture drawer. It comprises in addition to the retarding device 10 for example a drawer closing arrangement which pulls the drawer into its fully closed position. To this end, upon sliding the drawer to its closed position, the retarding device 10 connected to the drawer engages a receiver 7 firmly mounted to the furniture in order to retard the closing movement of the drawer relative to the furniture. At the same time or after an additional further closing distance toward the end position of the drawer, a pull-back arrangement is triggered by which the drawer is pulled for example into its closed position against the retardation force generated by the retarding device. The retarding device 10 remains during this process in engagement with the receiver 7.

The retarding device 10 comprises a cylinder 21 with a piston unit 41 consisting of a piston 54 and a piston rod 42 movably supported in the cylinder 21. The piston 51 carries a piston seal element 71. The outwardly extending end of the for example cylindrical piston rod 42 carries in the embodiment shown a grasping element 11 which releasably engages the receiver 7.

The cylinder 21 comprises a cylinder sleeve 22 with a cylinder open end 29 and a cylinder bottom 28 installed into an end of the sleeve 22. The cylinder sleeve 22 and the cylinder bottom are for example injection molded components of a thermoplastic material such as polyoximethylene. The cylinder sleeve 22 is shown to be cylindrical at the outer surface thereof. It has a length of for example five and a half times its diameter. It has a non-cylindrical inner wall 23 in the form of a truncated cone sleeve. The smaller cross-sectional area of the truncated cone sleeve is at the open end 29 of the cylinder 21, the larger cross-sectional area is at the cylinder bottom 28. The last mentioned cross-sectional area is about 80 mm$^2$. The inclination of the cone is for example 1:140. The inner wall 23 may be polished. The minimum wall thickness of the cylinder sleeve 22 is for example 6% of the outer diameter thereof.

In the inner wall 23 of the cylinder 21, a longitudinal groove 21 is provided. Its length is for example 70% of the cylinder length and it ends at the cylinder bottom 28. The width is for example 2% of the larger inner diameter of the cylinder 21. The depth of the groove 24 in this exemplary embodiment is one fourth of its width. At the inner wall 23, the groove ends with a sharp edge. The groove tapers off with an inclination of for example 45 degrees. Instead of a single groove, several grooves 24 may be provided in the inner wall 23. The grooves may also extend threadlike along the inner wall 23 of the cylinder sleeve 22.

At the bottom end 26 of the cylinder sleeve 22, an additional groove 25 is provided in the inner wall 23 of the cylinder of the embodiment shown in FIG. 1. This longitudinal groove 25—it may be displaced by 180° with respect to the groove 24—is for example twice as wide as the groove 24 and its length is for example 15% of the length of the cylinder 21.

The depth of this groove 25 is in this case one eighth of its width. Also, this groove 25 has a sharp edge at the inner cylinder wall and also tapers off with an inclination of 45°.

Each of these grooves 24, 25 increases the cross-section of the internal cylinder space 35.

For the installation of the cylinder bottom 28, the bottom end is provided for example with a double step, rotationally symmetrical indent 27. During mounting of the cylinder bottom 28, the air is displaced from the outer indent outwardly, whereas the air of the inner indent is displaced into the internal cylinder space 35. It is also possible to provide in the cylinder bottom 28 a central bore which, after installation of the cylinder bottom 28, is closed by a seal plug.

In the cylinder end 29, in this embodiment the piston rod accommodating opening 31 and the piston rod seal 32 are arranged. The piston rod seal 32 may be formed into the cylinder head end 29.

The piston 51 and the piston rod 42 of the piston unit 41 are formed integrally. The piston unit 41 is shown in FIG. 2 by itself as an enlarged part for better understanding. The unit's overall length corresponds in this embodiment to the length of the cylinder 21. The maximum diameter of the piston unit 41 is for example 98% of the inner diameter of the cylinder 21.

The piston 51 has several stepped-diameter areas 52-54. A first diameter area 52 adjacent the piston rod 41 has an abutment shoulder 61 by which the stroke of the piston unit 41 in the cylinder 21 is limited. This area 52 represents the maximum diameter of the piston 51. Adjacent this first diameter area 52, there is a cylindrical pressure chamber area 53, which has a diameter of for example 70% of the smaller inner diameter of the cylinder 21. The length of this pressure chamber area 53 is in the shown embodiment 150% of the smaller inner cylinder diameter. The front surface 63 which extends between the two diameter areas 52, 53 includes an annular undercut groove 62. Thinner wall of the annular axially extending groove 62 is for example aligned with the surface of the pressure chamber area 53.

Adjacent the pressure chamber area 53, the piston 51 is provided, in the direction away from the piston rod 42 with a circumferential piston groove 57. The piston 51 comprises, in the shown embodiment, in the area of the piston groove 57 a truncated conical area 54 with a diameter which increases toward the piston rod 42. The truncated cone surface generating lines enclose with the centerline of the piston unit 41 an angle of 15°. The piston groove 57 is delimited in axial direction by two radial surface areas 58, 59.

In the direction facing away form the piston rod 42 the piston rod is provided with a contact flange 64 whose outer diameter corresponds for example to the diameter of the pressure chamber area 53 of the piston 51.

The piston 51 has for example two longitudinal grooves 65, 66 disposed opposite each other. They extend through the abutment flange 64, the truncated conical area 54 and the pressure chamber area 53. The sum of the minimum cross-sectional areas of the longitudinal grooves 65, 66 in the shown embodiment is 1% of the smaller inner cross-section of the cylinder 21.

The piston seal element 71, see FIG. 3, is preferably pot shaped. Its length is for example 22% of the piston stroke. It comprises a cylindrical sleeve area 72 at the end of the piston, a first deformation area 73 and a second deformation area 74 between the first deformation area 73 and the cylindrical sleeve area 72. Between the first and the second deformation areas 73, 74, the piston seal element 71 has an inner support ring 75. The second deformation area 74 extends accordingly between the cylindrical sleeve area 72 and the support ring 75.

The length of the cylindrical sleeve area is in the particular embodiment 30% of the length of the piston seal element 71. With this cylindrical sleeve area, the piston seal element 71 is disposed in the axial undercut groove 62, see FIG. 1.

The first deformation area 73 comprises a corbelling seal collar 83. Before installation of the piston seal element 71, the outer diameter of this seal collar is for example greater than the smallest inner diameter of the cylinder 21. The length of the seal collar 83 is in this case 13% of the length of the piston seal element 71. Its thickness is 6% of the smallest inner cylinder diameter. The transition of the seal collar 83 to the rest of the piston seal element 71 is provided by a resilient joint structure 76.

The length of the second deformation area 74 is in the exemplary embodiment 50% of the length of the piston seal element 71. The outer diameter of this area 74 is for example 98% of the smallest inner diameter of the cylinder 21. The wall thickness of the second deformation area 74 increases for example from 6.5% of the smallest inner cylinder diameter to 9% of this reference size. Herein, the area of the smaller wall thickness is arranged in the proximity of the first deformation area. On the cylindrical outer surface—see FIGS. 5 and 6—for example, four longitudinal impressions 77 with a depth of about 3% of the outer diameter of the piston seal element 71 are arranged so that corresponding longitudinal projections 78 are formed on the inner surface 79 of the piston seal element 71.

The support ring 75 has for example an axial length of 15% of the piston seal element 71. In the representation of FIGS. 1 and 3, its inner surface has a truncated cone shape. Its smallest diameter which is disposed adjacent the seal collar 83 is 50% of the smallest inner diameter of the cylinder 21. The inclination of truncated cone 86 corresponds to the inclination of the truncated cone area 54 of the piston 51, wherein the inner diameter of the bracing ring 75 increases toward the second deformation area 74. The end faces 88, 89 at the bracing ring 75 form for example abutment surfaces for abutting the axial limit areas 58, 59 of the circumferential piston groove 57.

The axially outer surface of the piston seal element 71 which faces away from the seal collar 83 forms another support surface 81 for engagement of the piston seal element 71 with the piston 51.

The piston seal element 71 consists for example of nitrile-butadiene-cautschuk provided with a halogenized surface.

FIG. 4 shows a piston unit 41 with an annular piston groove 57 of constant diameter. The piston 51 has accordingly a cylindrical area 56 in the groove 57 rather than a truncated cone area 54. The longitudinal grooves 65, 66 extend as channels through the abutment flange 64, the cylindrical area 56 and the pressure chamber area 53.

Figure 5:
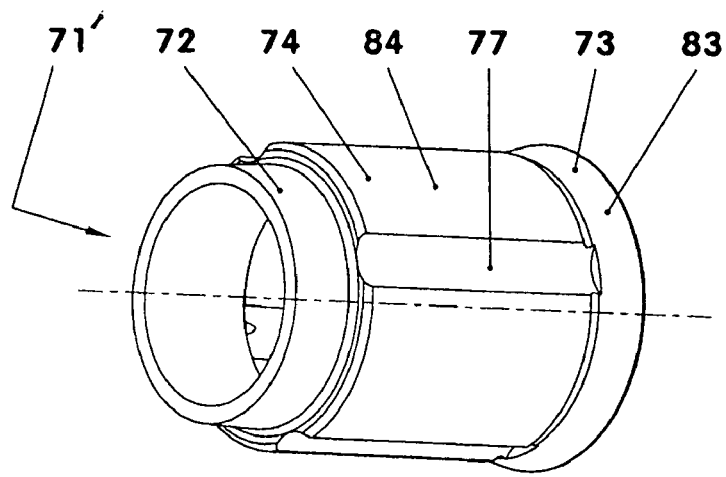
FIG. 5 is a perspective view of the piston seal structure.
Figure 6:
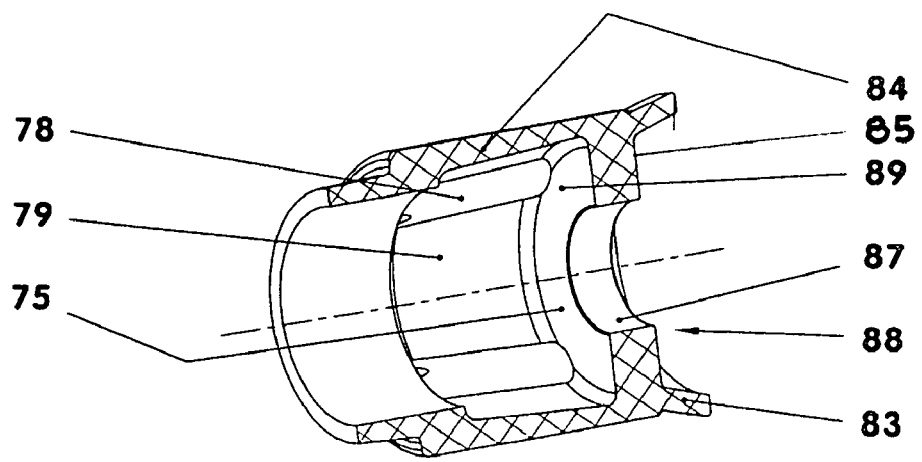
FIG. 6 shows the piston seal structure of FIG. 5 in an axial cross-sectional view.

FIGS. 5 and 6 show the seal element 71' for the piston unit 41 as shown in FIG. 4. Contrary to the piston seal element 71 shown in FIGS. 1 and 3, the piston seal element 71' has a support ring 85 with a cylindrical inner surface 87.

The retarding device 10 as shown in FIGS. 1-6 compresses therefore—without the engagement element 11 and the piston rod seal 32—of four separate parts. Those are the cylinder sleeve 22, the piston unit 41, the piston seal element 71 and the cylinder bottom 28. These individual parts 22, 41, 71, 28 can be manufactured inexpensively for example by injection molding.

During assembly, the piston seal element 71 is axially slipped onto the piston 51 of the piston unit 41. During this step, the support ring 75 is expanded when moved over the abutment flange 64 and then captured in the piston groove 57 with axial play. The cylindrical sleeve area 72 is in this procedure slipped into the axial undercut groove 62. After installation, at least the second deformation area 74 of the seal element has a radial play with respect to the piston 51. The seal collar 83 is disposed at the end of the piston unit 41 opposite the piston rod 42. The piston unit 41 with the piston seal element 71 is for example inserted into the cylinder sleeve 22 from the bottom end 26 of the cylinder sleeve 22. Then the cylinder sleeve 22 is closed by the cylinder bottom 28 and, if applicable the engagement element 11 is mounted onto the piston rod 42. This assembly requires only a few seconds. In this way, a large number of retarding devices can be produced within a short period and at low costs.

The engagement element 11 may also be formed as part of the piston rod 42 or it may be attached to the piston rod as shown in the FIG. 1.

In the assembled state of the shown embodiment, the piston 51 and the cylinder bottom 28 delimit a displacement chamber 15 in the cylinder 21. A compensation chamber 16 is formed between the piston 51 and the cylinder head end 29. The piston seal element 71 and the piston 51 form a pressure chamber 17, which is in communication with the displacement chamber 15 via the longitudinal grooves 65, 66.

When the piston 51 of the retarding device 10 is extended, it is accommodated in the smaller diameter area of the cylinder 21. In this area, it abuts the cylinder head 29 and is outside the groove 24. The inner wall 23 of the cylinder 21 is smooth in this area. The seat collar 83 is in contact with the inner cylinder wall 23 in a non-sealing fashion. When not deformed, the second deformation area 74 is disposed, with play, circumferentially just a small distance from the cylinder wall 23 and also from the piston 51.

The assembled retarding device 10 can now be installed in a guide system of a furniture part such as a drawer.

When the drawer is opened, the retarding device 10 is disengaged from the receiver 7. The piston unit 41 is extended and also a pull-back arranged is disengaged.

Upon closing of the drawer, the engagement element 11 engages the receiver 7 in a partial stroke next to the closed position of the drawer. The piston rod 42 is then moved into the cylinder 21 by an external force. The piston 51 is displaced as a result from the cylinder end 29 toward the cylinder bottom end 28. In this process, the volume of the displacement chamber 15 is reduced. The gas pressure that is the air pressure in the displacement chamber 15 is increased thereby and generates an internal force acting on the piston seal element 71. Immediately at the beginning of inward movement of the piston rod 42, the seal collar 83 is pressed against the inner cylinder wall 23 with deformation of the resiliently flexible joint structure 76. The displacement chamber 15 and the compensation chamber 16 are fully isolated from each other in this way.

Pressure building up in the displacement chamber 15 is also present in the pressure chamber 17 via the longitudinal grooves 65, 66 forming communication channels between the displacement chamber 15 and the pressure chamber 17, where the gas pressure is effective on the second deformation area 74. The latter is supported at the support ring 75 and the cylindrical sleeve area 72. When the relatively large inner surface 79 is subjected to the internal pressure, the deformation area 74 curves radially outwardly, the maximum outward deformation occurring in the center part of the second deformation area 74. The second deformation area 74 then abuts as a brake sleeve the inner wall 23 of the cylinder 21 and brakes movement of the piston out of the cylinder end position into the displacement chamber 15.

Because of the relatively large size of the sleeve area 72 and its double support, the second deformation area 74 is deformed relatively slowly. That is, the pressure change in the displacement chamber 15 causes a reaction of the second deformation area 74 which is delayed with respect to that of the first deformation area 73. The first deformation area reacts essentially immediately with a pressure change in the displacement chamber 15 whereas the second deformation range 74 follows with a small delay.

During the deformation of the brake sleeve 84, the piston seal element 71 is shortened in axial direction. The support ring 75 moves along the truncated cone area 55 toward the piston rod 42 and, in the process, presses the second deformation area 74 further outwardly radially whereby the braking effect of the braking sleeve 84 is enhanced. The communication channels 65, 66 remain open so that the displacement chamber 15 and the pressure chamber 17 remain in communication over the whole piston stroke.

Upon further movement of the piston rod 42 into the displacement chamber 15, the seal collar 83 and the brake sleeve 84 abutting the inner cylinder wall 23 in combination with the increasing pressure in the displacement chamber 15 cause rapid retarding of the piston movement. The drawer is rapidly braked down.

With further movement of the piston rod 42, the piston 51 reaches the increased diameter area of the displacement chamber 15 so that the engagement area of the seal collar 83 and of the brake sleeve 84 with the inner cylinder wall 23 becomes smaller. The radial engagement force caused by the gas pressure in the displacement chamber 15 on the inner cylinder wall 23 decreases with further movement of the piston 51 into the displacement chamber 15 so that the retardation of the stroke movement caused by the friction also decreases: As the seal collar 83 of the piston seal element 71 passes the rear end of the groove or channel 24, the compressed air is released from the displacement chamber 15 via the longitudinal groove 24 and the passages formed by the impressions 77 into the compensation chamber 16 so that the pressure in the displacement chamber drops rapidly. The brake sleeve 84 may still be in contact with the inner cylinder wall 23 in this stage.

As soon as the piston element 71 is no longer in contact with the inner cylinder wall 23 additional air flows from the displacement chamber 15 into the compensation chamber 16. The piston seal element 71 assumes now its original shape which it had before the start of the stroke movement. The drawer has now a slow residual speed.

During the retardation of the stroke movement, the drawer may be coupled to a closing pull arrangement. Such an arrangement may include a spring which applies an additional internal force to the guide structure of the drawer. This force is also effective on the retarding device as an external force. The drawer then moves slowly with little retardation to its end position where it remains without rebound.

When the drawer is again pulled out, air flow out of the compensation chamber 16 via the passage 24, 25, 77 into the displacement chamber 15. The piston seal element 71 remains essentially undeformed and is at least over the largest part of the stroke not in contact with the inner cylinder wall 23. During the extension movement air flow from the compensation chamber to the displacement chamber 15 is essentially unrestricted. The extension movement occurs therefore essentially without resistance.

As soon as the piston rod 42 is fully extended, the engagement element 11 disconnects from the receiver 7. The retarding device is then disengaged. The piston rod 42 of the retarding device is in its fully extended position. The pull-back arrangement is disconnected.

FIG. 7 shows another embodiment of a retarding device 10'. In this retarding device, the piston rod 42', the piston 51' and the piston seal element 71' form the piston unit 41'. Here, the piston unit 41' may consist for example of two different material structures which are joined. They comprise for example a piston seal element 71' of nitrile-butadiene-caoutchouc, whereas the piston 51' and the piston rod 42' consist of a different material such as a thermoplastic material which can be processed by an injection molding procedure.

In the embodiment shown, the piston 51' is disc-shaped. The piston seal element 71' is formed onto the piston 51 via a cylindrical sleeve structure 74' so that the piston seal element 71' extends pot-like toward the displacement chamber 15. The first and the second deformation areas 73, 74 are for example so formed as described in connection with FIGS. 5 and 6. The support ring 75, which may also have a cone-like inner cross-section, contributes with high resistance moment to a counteraction resisting a radial deformation of the piston seal element 71'. The inner diameter of the support ring 75 may be smaller than shown in FIG. 7 as long as the cross-section of the communication channels 65, 66 between the pressure chamber 17 and the displacement chamber 15 are greater than 1% of the smaller inner diameter of the cylinder 21.

During compression of the retarding device, that is, during movement of the piston 51 into the displacement chamber 15, the gas pressure in the displacement chamber 15 is increased. At the same time, the seal collar 83, which rapidly reacts to the pressure increase, is pressed into contact with the inner cylinder wall 23. The brake sleeve 84 reacts more slowly to the pressure increase in the displacement chamber 15 and is therefore first only slightly deformed. With further compression however the pressure in the displacement chamber 15 and in the pressure chamber 17 is further increased so that the brake sleeve 84 is further deformed and abuts the inner cylinder wall 23 while being axially contracted.

After passing the throttling channels or grooves 24, first the seal collar 83 disengages from the inner cylinder wall as a result of pressure equalization between the displacement chamber 15 and the compensation chamber 16 and returns to its rest position. The brake sleeve 84 retreats from the inner cylinder wall 23 only after the complete depletion of the excess pressure in the displacement chamber 15 with respect to the compensation chamber 16 and returns to its original shape.

The extension of the piston rod 42 occurs for example in the same way as described in connection with FIGS. 1-6.

As described in connection with FIGS. 1-6, also this embodiment of the retarding device 10 may be part of a guide system for a movable furniture component.

To this end, the piston rod may have a piston rod head 43 with engagement projections for retaining an engagement element 11.

Listing of Reference Numerals

| | |
|---|---|
| 1 | Ambient |
| 7 | Receiver |
| 10 | Retarding device |
| 11 | Engagement element |
| 15 | Displacement chamber |
| 16 | Compensation chamber |
| 17 | Pressure chamber |
| 21 | Cylinder |
| 22 | Cylinder sleeve |
| 23 | Inner wall of cylinder 21 |
| 24 | Longitudinal groove |
| 25 | Longitudinal groove |
| 26 | Bottom end |
| 27 | Indent |

-continued

Listing of Reference Numerals

| | |
|---|---|
| 28 | Cylinder bottom |
| 29 | Cylinder open end |
| 31 | Piston rod accommodating openings |
| 32 | Piston rod seal |
| 35 | Internal cylinder space |
| 41 | Piston unit |
| 42 | Piston rod |
| 43 | Piston rod head |
| 44 | Engagement projection |
| 51 | Piston |
| 52 | First diameter area |
| 53 | Pressure chamber area |
| 54 | Truncated cone |
| 55 | Truncated cone area |
| 56 | Cylindrical area |
| 57 | Annular piston groove |
| 58, 59 | Radial, axially limiting area |
| 61 | Abutment shoulder |
| 62 | axial undercut groove |
| 63 | Front surface |
| 64 | Abutment flange |
| 65, 66 | Longitudinal grooves |
| 71 | Piston seal element |
| 72 | Cylinder sleeve area |
| 73 | First deformation area |
| 74 | Second deformation area |
| 75 | Support ring |
| 76 | Resilient joint structure |
| 77 | Impressions on outer surface |
| 78 | Longitudinal inner projections |
| 79 | Inner surface of deformation area |
| 81 | Contact surface |
| 83 | Seal collar |
| 84 | Brake sleeve |
| 85 | Support ring |
| 86 | Truncated cone |
| 87 | Cylinder surface |
| 88, 89 | End faces |

What is claimed is:

1. A pneumatic retarding device (10) comprising a cylinder (21) having a smooth inner wall, a piston (51) with a piston rod (42) movably disposed in the cylinder (21), the piston (51) dividing the cylinder (21) into a displacement chamber (15) and a compensation chamber (16) and being provided with a piston seal element (71) for sealingly separating the displacement and compensation chambers (15, 16) so that movement of the piston into the displacement chamber (15) causes compression of air in the displacement chamber (15) and generates a counterforce opposing movement of the piston (51) into the displacement chamber (15), and means permitting a controlled air leakage flow past the piston (51) out of the displacement chamber (15) for damping movement of the piston into the displacement chamber, the piston (31) and the piston rod (42) being a one-part piston unit (41), with the piston seal element (71) accommodated on the piston (51) comprising two deformation zones (73, 74), a first rapidly responding deformation zone (73) which is in contact with the smooth inner wall (23) of the cylinder (21) when the retarding device is expanded and the piston (51) is in a retracted end position, and a second deformation zone (74) formed by the seal element (71) which reacts slower to a pressure generated in the displacement chamber (15) upon movement of the piston (51) into the displacement chamber (15) than the first deformation zone, the seal sleeve element (71) being a sleeve having an outer surface arranged in spaced relationship from the inner cylinder wail (23) and enclosing an inner pressure chamber (17) in communication with the displacement chamber (15) via a throttling passage permitting pressurization of the pressure chamber (17) for expanding the sleeve (74) into braking engagement with the inner cylinder wall (23) while contracting axially, the piston seal element (71) being supported on the piston (51) via a support ring (75) by a truncated conical surface area (55) of the piston (51) which is arranged between the two expansion zones (73, 74) and whose diameter increases with increasing distance from the displacement chamber (15).

2. The pneumatic retarding device according to claim 1, wherein the piston unit (41) includes an engagement element (11).

3. The pneumatic retarding device as defined in claim 2, wherein the one-part piston unit (41) comprises the piston (31), the piston rod (42) and the piston seal element (71) which has at least the first and second deformation zones (73, 74) wherein, with a pressure change in the displacement chamber (15), the first deformation zone (73) reacts rapidly to the pressure change and the second deformation zone (74) reacts slower than the first deformation zone (73).

4. The pneumatic retarding device according to claim 3, wherein the piston unit (41) consists of at least two different materials.

5. The pneumatic retarding device according to claim 4, wherein the piston seal element (71) consists of nitrile-butadiene-caoutchouc.

6. The pneumatic retarding device according to claim 1, wherein the cylinder (21) is slightly conical having a larger cross-section at its end remote from the piston rod than at its opposite end in which the piston (51) is in its rest position.

7. The pneumatic retarding device according to claim 6, wherein the throttling passage extending between the displacement chamber (15) and the pressure chamber (17) has a flow cross-section of at least 1% of the smallest inner cylinder cross-section.

8. The pneumatic retarding device according to claim 1, wherein the first deformation zone (73) is arranged at the end of the piston facing the displacement chamber (15).

9. A guide system with a pneumatic retarding arrangement (10) according to claim 1.

\* \* \* \* \*